United States Patent [19]
Luy et al.

[11] Patent Number: 5,766,557
[45] Date of Patent: Jun. 16, 1998

[54] FLUIDIZED-BED APPARATUS

[75] Inventors: Bernhard Luy, Freiburg; Matthias Tondar, Hausien, both of Germany

[73] Assignee: Glatt GmbH, Binzen, Germany

[21] Appl. No.: 772,725

[22] Filed: Dec. 23, 1996

[30] Foreign Application Priority Data

Dec. 29, 1995 [CH] Switzerland .......................... 03709/95

[51] Int. Cl.[6] ................... F16J 15/46; B01J 8/18
[52] U.S. Cl. ................. 422/139; 422/143; 422/144; 292/1; 292/256.65; 49/477.1
[58] Field of Search ..................... 422/139, 143, 422/144, 145; 292/256.65; 49/477.1

[56] References Cited

U.S. PATENT DOCUMENTS

| | | | |
|---|---|---|---|
| 2,606,046 | 12/1952 | Bonner et al. | 34/242 |
| 4,073,521 | 2/1978 | Mena | 292/256.65 |
| 5,326,550 | 7/1994 | Adris et al. | 422/139 |
| 5,368,824 | 11/1994 | Nell et al. | 422/139 |

FOREIGN PATENT DOCUMENTS

736 209   11/1932   France .

*Primary Examiner*—Hien Tran
*Attorney, Agent, or Firm*—Jacobson, Price, Holman & Stern, PLLC

[57] ABSTRACT

The container of the fluidized-bed apparatus has two wall parts detachably connected to one another and contains a pivotable perforated bottom arranged approximately at the height of the abutment point of the two wall parts. Each of the two wall parts is provided, at the abutment point, with an annular groove essentially arc-shaped in cross-section. The two grooves together form a channel open toward the container interior and contain a hollow seal which is circular in cross-section in the relaxed state. Said seal can be deformed by a fluid under pressure which is passed into it, for example compressed air, in such a way that, at a first fluid pressure value, it connects the two wall parts tightly to one another and at the same time tightly to the perforated bottom and that, at a second, lower fluid pressure value, it still connects the two wall parts tightly to one another but is separated from the perforated bottom by annular gap, so that said perforated bottom can be swivelled.

12 Claims, 3 Drawing Sheets

Fig. 1

FLUIDIZED-BED APPARATUS

BACKGROUND OF THE INVENTION

1. Field of the Invention

The invention relates to a fluidized-bed apparatus.

2. Description of the Prior Art

Known fluidized-bed apparatuses have a container which contains a pivotable perforated bottom. The wall of the container consists of a plurality of wall parts which abut one another in pairs at abutment points, are detachably connected to one another and are sealed at the abutment points with annular gaskets which are solid and rectangular in cross-section and each of which is held in an annular groove in a wall part. The wall has a ring which is located close to an abutment point of two wall parts, encloses the perforated bottom and has an annular groove which is open toward the perforated bottom and quadrilateral in cross-section. An annular, hollow, inflatable seal which is generally quadrilateral in cross-section and usually has ribs or lips with edges on its side facing the perforated bottom is arranged in said annular groove. When the perforated bottom is in its horizontal operating position, the hollow seal can be inflated with compressed air so that the seal tightly connects the perforated bottom to the wall.

These known fluidized-bed apparatuses have the disadvantage that two separate seals are required for sealing the two wall parts abutting one another close to the perforated bottom and for tightly connecting the perforated bottom to the wall. Furthermore, the gaskets arranged between wall parts and the inflatable seal which is quadrilateral in cross-section, together with the parts sealed against one another by then, bound channels and/or fissures and/or crevices which have corners in cross-section. In particular, fissures and other gaps and/or other cavities which are not filled by the seals and have corners in cross-section are also present in the annular grooves. For the gas flowing through the container during fluidization of the material, such channels, fissures, crevices and other gaps and/or other cavities form, during operation, dead spaces in which dust particles and other impurities readily collect. If the particles of the fluidized-material are sprayed with a liquid, for example for agglomeration or for application of coatings, this liquid may likewise enter the annular grooves and other dead spaces and glued these up together with the dust particles.

Some known fluidized-bed apparatuses are equipped with wet cleaning devices for spraying a cleaning liquid against the inner surfaces of the wall of the container and against the perforated bottom. However, the stated dead spaces prevent cleaning with the aid of such a cleaning liquid. In particular, impurities and cleaning liquid frequently enter the annular grooves containing the seals and remain therein. In the case of the known fluidized-bed apparatuses, the interior of the container can therefore be cleaned only poorly by spraying a cleaning liquid. In particular, this gives rise to the danger that cultures of microorganisms develop in the dead spaces.

If the purity of the particulate materials processed in the container of a fluidized-bed apparatus has to meet high requirements, it is therefore often necessary, particularly when changing the processed materials, for the operator to open and dismantle the container and temporarily to remove the seals and perforated bottom for cleaning. If toxic materials or materials which are otherwise hazardous to health were processed, however, opening of the container and dismantling of the parts may cause contamination of the environment and endanger the person(s) who open and clean the container.

U.S. Pat. 4,073,521 and French Patent 736,209 disclose inflatable seals which have outer surfaces which are circular in cross-section. However, these seals are used not for tightly connecting parts of a fluidized-bed apparatus but for connecting two parts of other apparatuses. Moreover, these parts and seals together likewise bound polygonal cavities and/or fissures in which dust and other impurities might collect. Furthermore, the problem of avoiding the accumulation of such impurities is not discussed at all in the two patents.

SUMMARY OF THE INVENTION

It is the object of the invention to provide a fluidized-bed apparatus with which disadvantages of the known fluidized-bed apparatuses can be avoided. It should be permitted in particular that as small amounts of impurities as possible collect in the sealing members and the solid parts connected tightly together by said members, that the sealing members and the stated solid parts can be cleaned with little work and in a short time without opening the container and without dismantling it, and that the sealing members and the container can be provided and assembled in an economical manner.

This object is achieved, according to the invention, by a fluidized-bed apparatus having a container which has a wall with two wall parts abutting one another and removable from one another, having a perforated bottom arranged in the container and having sealing members for connecting the two wall parts tightly to one another and the perforated bottom tightly to the wall, wherein each of the two wall parts has an annular groove which is bounded in cross-section, at least in part, by a concave groove surface, wherein the two grooves together form a channel, open toward the perforated bottom, in wall parts abutting one another, wherein the sealing members have an annular seal which has a cavity for receiving a fluid, a smooth outer surface which is, at least in part, convex in cross-section and continuous in cross-section around the entire seal and cross-sectional segments which are located in the two grooves in wall parts abutting one another, and wherein the perforated bottom and the seal are formed in such a way that the seal is deformable by a fluid, fed to its cavity and under pressure, so that the seal rests tightly against both wall parts and against, the perforated bottom.

According to the invention, the outer surface of the seal is convex in cross-section, at least in part, and continuous around the entire seal and smooth. "Continuous and smooth" is understood as meaning that the outer surface has no corners in cross-section and no ribs or lips or other projections and no furrows or other indentations.

According to the invention, each groove present in one of the two wall parts is bounded by the convex groove surface in cross-section, at least in part, preferably at least for the most part and, for example, essentially completely. However, the grooves may have, at their inner edges, a narrow transition surface convex in cross-section and/or possibly a flat surface. When the cavity of the seal contains a fluid under pressure and the seal connects the wall parts tightly to one another, the seal is then preferably essentially adjacent to all the surfaces bounding the grooves and in particular to all the groove surfaces which are concave in cross-section, so that the seal essentially completely fills the grooves.

As a result of the formation, according to the invention, of the fluidized-bed apparatus, it is possible to ensure that virtually no channels, fissures, crevices or other gaps and/or other cavities which form dead spaces occur in the seal and in those sections of the wall parts connected tightly to one another by the seal and of the perforated bottom which are adjacent to said seal. This at least substantially prevents undesired material deposits in the seal and considerably improves the cleanability of the seal, of the wall parts and of the perforated bottom. The fluidized-bed apparatus according to the invention is therefore particularly suitable for the production of rugs and other products which must have high purity.

The concave groove surface widens in cross-section, preferably over its entire height, from the base of the groove toward its edges. In addition, any non-concave surface bounding the groove should preferably be formed in such a way that the groove becomes broader in its direction away from the base of the groove or at least has a constant width also at the height of the or each nonconcave surface. This makes it possible to insert the seal easily and without deformation into the groove and if necessary to remove it easily from the groove—for example for changing the seal.

The concave groove surface of each groove preferably forms an arc in cross-section. Said arc extends in cross-section over a center angle which is expediently at most 180°, preferably less than 180° and preferably at least 120° and, for example, 130° to 175°.

The outer surface of the seal is curved in a convex manner in cross-section around the entire seal and, for example, is circular in cross-section, preferably at least in a certain state, for example in the undeformed state of said seal, i.e. when the same pressure is present in the cavity of the seal and outside it, and/or for example when its cavity contains a fluid whose pressure is greater than the pressure present in the environment of the seal and when no solid parts engage the outside of the seal. However, in the certain state mentioned—in particular in the relaxed state—the outer surface of the seal could be oval or elliptical in cross-section or could even have straight sections which are connected to one another by convex sections. However, the outer surface of the seal should not be concave in cross-section anywhere.

The fluidized-bed apparatus advantageously also has at least one wet cleaning device with at least one spray member for spraying a cleaning liquid in the container and for cleaning or washing the inner surfaces of the wall parts, the perforated bottom and that section of the seal which is adjacent to the interior of the container and/or is present therein. The inner surfaces of the wall parts, the stated sealing section and the perforated bottom can then be thoroughly cleaned without having to open the container and to remove the perforated bottom. Spraying a cleaning liquid in the container interior permits adequate cleaning, for example, even when the product produced in the container is changed during the production of products which serve for the formation of drugs and/or are toxic. Cleaning can be carried out substantially or completely mechanically and automatically—i.e. virtually without the participation of persons. This makes it possible to prevent the purity and quality of the products produced from being impaired by human influences, such as, for example, insufficient care on the part of a person when carrying out cleaning work. Furthermore, substances which are hazardous to health and/or otherwise environmentally harmful can be prevented from passing from the container into the environment during cleaning and causing contamination of the environment and endangering persons. Moreover, costs can be reduced by automation of the cleaning.

BRIEF DESCRIPTION OF THE DRAWINGS

The subject of the invention is described in detail below with reference to an embodiment. In the drawings.

DESCRIPTION OF THE PREFERRED EMBODIMENTS

Figure 1:
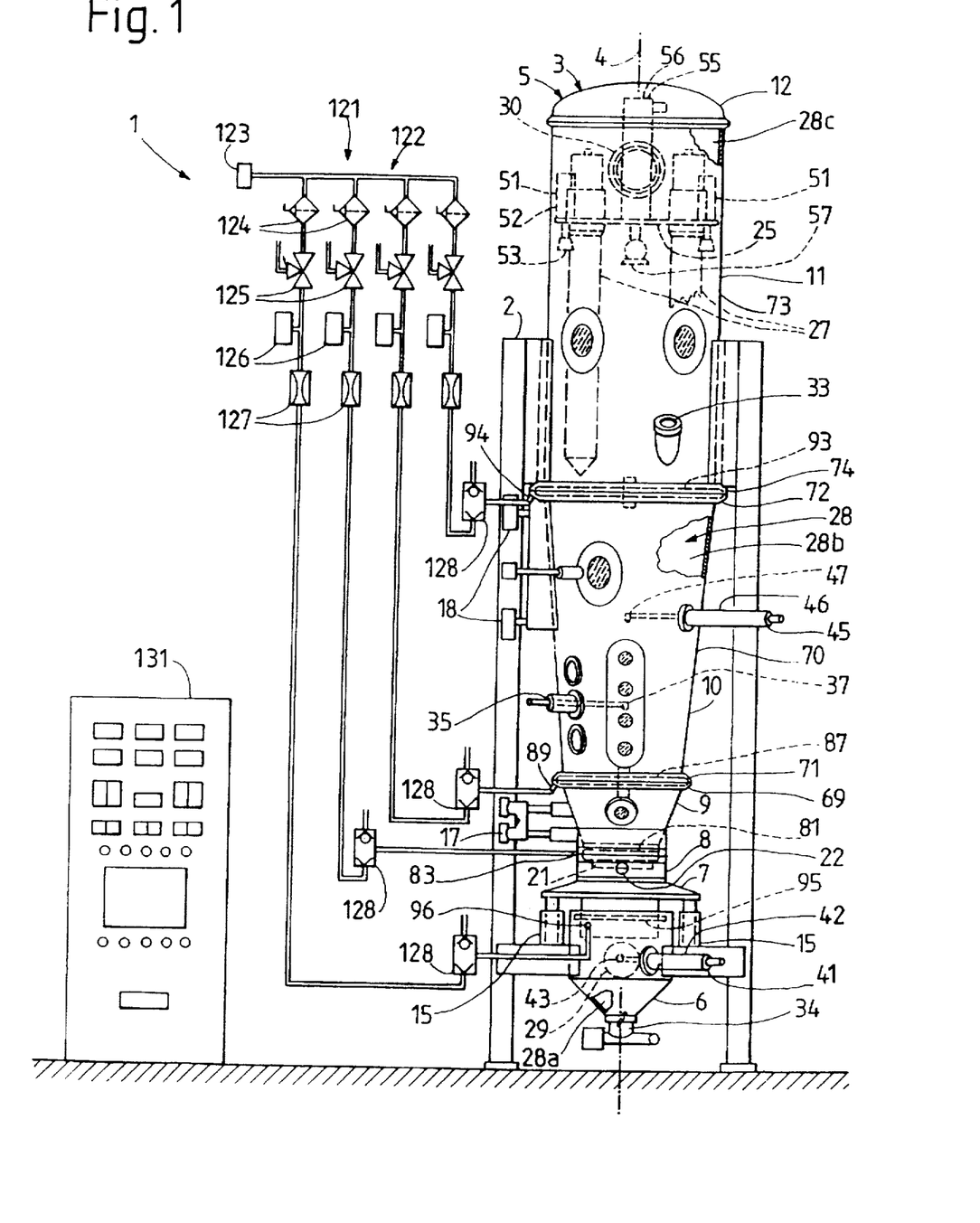
FIG. 1 shows a view of the container of a fluidized-bed apparatus.

The fluidized-bed apparatus 1 shown in FIG. 1 has a stand 2. This has two vertical pillars and other parts and holds a fluidized-bed container 3 arranged between the pillars. The container 3 defines a vertical container axis 4 and has a wall 5 which is generally rotationally symmetrical with respect to said axis. Said wall has a plurality of wall parts arranged one on top of the other and connected tightly to one another in a detachable and/or adjustable manner and in the position shown, namely, from bottom to top, a bottom wall part 6, a vertically displaceable wall part 7, a generally cylindrical connecting wall part 8, a conical material chamber wall part 9, a conical expansion chamber wall part 10, a cylindrical filter chamber wall part 11 and a top wall part 12 which for the most part is arched. The fluidized bed apparatus is furthermore equipped with connecting members for adjusting the wall parts 6 to 12 and detachably connecting them to one another. These connecting members include two hydraulic adjusting devices 15, hinge members 17, 18 and screws and the like.

A gas-permeable perforated bottom 21 is arranged in the container 3. The perforated bottom 21 is mounted on the connecting wall part 8 by means of bearing and pivot members 22 so that it is pivotable about a horizontal axis of rotation and can be fixed in various pivotal positions. The perforated bottom 21 can be held in particular in a horizontal operating position and in an approximately vertical emptying position. As will be described in detail, in the operating position the perforated bottom is approximately at the height of the abutment point at which the two wall parts 8, 9 abut one another. The container 3 also has an inner wall part 25 which forms a partition. The inner wall part 25 is arranged in the upper half of the filter chamber wall part 11, enclosed by said wall part and tightly connected to it. The inner wall part 25 holds at least one filter 27 detachably fastened to it, and preferably at least two such filters, each of which is provided with a dimensionally stable, gas-permeable, metallic casing.

When the wall parts 6 to 12 are tightly connected to one another, they together enclose a container interior 28 which is sealed tightly from the environment. The perforated bottom 21 in the normal, horizontal operating position and the inner wall part 25 and the filters 27 fastened to said wall part divide the interior 28 into a gas distribution space 28a located below the perforated bottom, a fluidizing and process space 28b located between the perforated bottom and the inner wall parts 25 and a clean gas space 28c located above the inner wall part 25.

The bottom wall part 6 is provided with a gas inlet 29. A gas outlet 30 is arranged in the filter chamber wall part 11, above the inner wall part 25. The fluidized-bed apparatus 1 furthermore has a gas conduction member, which is not shown, for passing a process gas—for example air—from the gas inlet 29 through the container 3 upward to the gas outlet 30. The container 3 furthermore has a material inlet 33 which opens into the process space 28b and a material outlet arranged at the lower end of the bottom wall part 6. The material inlet and the material outlet have alternatively closable and openable passages. Also present is a spray device 35 which has at least one spray member 37 arranged in the process space 28b and having at least one nozzle for spraying at least partly liquid material onto the particles of the particulate material which are fluidized in the container 3.

At least one wet cleaning device or wash device 41 has a holder which is fastened to the bottom wall part 6, below the perforated bottom 21, and has a housing 42 and at least one spray member 43 with at least one nozzle. At least one wet cleaning device or wash device 45 has a holder fastened to the expansion chamber wall part 10, above the perforated bottom 21 and above the spray deice 45, and having a housing 46 and at least one spray member 47 with at least one nozzle. The housings 42, 46 are arranged essentially outside the wall 5 and contain a housing interior sealed tightly from the environment. The spray members 43 and 47 are horizontally displaceable in the housings 42 and 46, respectively, and can be brought alternatively into a rest position or into a cleaning position shown in FIG. 1. In the rest position, they are essentially outside the container interior 28 of the container, in the housings 42 and 46. The interiors of the latter are then sealed, from the container interior 28, for example by the spray members 43 and 47 and/or by additional closure members, approximately flush with the inner surface of the wall 5. In the cleaning position, each spray member 43 and 47 is present at least partly in the gas distribution space 28a or process space 28b, respectively. The spray nozzles of the spray members 43 and 47 are the, for example, approximately at the container axis 4. The or a spray nozzle of the lower spray member 43 is directed upward. The or at least one nozzle of the upper spray member 47 is directed downwards.

The inner wall part 25 furthermore holds at least one wet cleaning device or wash device, for example a plurality of first wet cleaning devices or wash devices 51 distributed around the container axis 4 and a larger, second wet cleaning device or wash device 55 coaxial with the container axis being present. Each wet cleaning device 51, 55 has a housing 52 or 56 located essentially above the inner wall part 25 in the container 3 and a spray member 53 or 57. Each spray member 53, 57 is adjustable and displaceable in the coordinated housing 52 or 56, respectively, and can be displaced from a rest position, in which it is essentially inside the coordinated housing and is flush with the lower surface of the inner wall part 25, into the cleaning position shown in FIG. 1, in which it is at least partly in the process space 28b, approximately at the height of the upper end sections of the filters 27.

The housings 42, 46, 52, 56 of the various wet cleaning devices 41, 45, 51, 55 have an inlet for a cleaning liquid. Each wet cleaning device is, for example, furthermore provided with a spring and is formed in such a way that, when a cleaning liquid under pressure is fed in, the spray member, starting from its rest position, is displaced to the cleaning position against the restoring force generated by the spring. The spray member then remains in the cleaning position until the feed of cleaning liquid has ended and the spray member is pushed back into the rest position by the spring.

Some details of the wall 5 of the container 3 and the perforated bottom 21 will be described in more detail below, reference being made to FIGS. 2, 3 and 4.

The connecting wall part 8 has an inner casing 63, and outer casing 64 and, at its ends, an annular flange 65 or 66.

The two casings 63, 64 are cylindrical and are tightly welded at their ends to the two annular flanges 65, 66. The material chamber wall part 9 has an essentially conical casing 67 which is tightly welded at its ends to an annular flange 68 or 69. The expansion chamber wall part 10 has an essentially conical casing 70 which is tightly welded at its ends to an annular flange 71 or 72. The filter chamber casing 11 has a cylindrical casing 73 which is welded at its lower end to an annular flange 74. Also present is a hollow cylindrical reinforcing part 75 which connects the outer edge of the annular flange 68 to a section of the casing 67 and is welded to the casing 67, to the annular flange 68 and to a sleeve-like part of the hinge members 17 and protects the channel between the outer surface of the casing 67 and the flat, horizontal surface on the upper side of the annular flange 68 from impurities.

Each annular flange 66 and 68 has a central hole coaxial with the container axis 4. These holes are partly bounded by cylindrical inner surfaces 66a and 68a flush with one another. The two annular flanges 66, 68 have, at their end faces facing one another, flat, radial, essentially annular support surfaces 66b and 68b perpendicular to the container axis 4. Each annular flange 66, 68 has, at its end face, an annular—that is to say circular—groove 66c or 68c. In cross-section—i.e. in a section through the container axis 4—each groove 66c, 68c is bound, at least for the most part, by a concave, namely circular groove surface. When the annular flanges 66, 68 rest on one another with their support surfaces 66b and 68b in the manner shown in FIGS. 1 to 4, the concave, circular groove surfaces ideally form, in cross-section, an arc of one and the same circle whose center is in the plane defined by the support surfaces 66b, 68b lyine one on top of the other. The outer groove edge of the groove 66c or 68c is in the plane defined by the support surface 66b or 68b, respectively. The inner groove edges of the grooves 66c and 68c are below and above, respectively, the plane defined by the support surfaces 66b and 68b, respectively, at least close to the cylindrical inner surfaces 66a and 68a. When the wall parts 8, 9 are connected to one another and the support surfaces 66b, 68b rest one on top of the other, the inner edges of the grooves 66c, 68c and the entire sections of the annular flanges 66 and 68 and of the wall parts 8 and 9 which are inside the grooves 66c, 68c in the direction of view parallel to the container axis are therefore a distance apart in the axial direction and are separated from one another by a gap—i.e. an annular gap. The two grooves 66c, 68c then together form an annular channel which is open in cross-section, i.e. in a section through the container axis, toward the container axis and the container interior 28. The outer edges of the grooves 66c, 68c are formed, for example, by solid edges. The inner edge of each groove 66c, 68c consists, for example, of a narrow transition surface which is convex in cross-section and connects the concave groove surface continuously to the cylindrical inner surface 66a or 68a. In cross-section, i.e. in a section through the container axis, the radii of curvature of these transition surfaces are substantially smaller than the radii of curvature of the concave groove surfaces and are preferably less than 5% of the last-mentioned radii of curvature. The inner surface 66a which forms a section of the inner surface of the wall part 8 runs downward away from the inner edge of the groove 66c and thus away from the wall part 9. The inner edge of the groove 66c is accordingly the highest point of that section of the wall part 8 which is enclosed by the groove 66c in axial protection and of its inner surface. The inner surface 68a forming a section of the inner surface of the wall part 9 runs upward away from the inner edge of the groove 68c and thus away from the wall part 8. The inner edge of the groove 68c is the lowest point of that section of the wall part 9 which is enclosed by the groove 68c in axial projection and of its inner surface. The two wall parts 8 and 9 are detachably connected to one another by screws 79 which belong to the above-mentioned connecting members and one of which is shown in FIGS. 2, 3, and 4.

An annular, hollow seal 81 is arranged between the annular flanges 66, 68 of the two wall parts 8 and 9, respectively. The seal 81 is formed, for example, from a hose section whose ends are tightly connected, for example adhesively bonded, to one another. The seal 81 has a casing with an outer surface 81a and an inner surface 81b. The casing of the seal 81 is of equal thickness everywhere so that the two inner surfaces 81a, 81b are parallel to one another and concentric with one another in cross-section. The seal 81 contains a cavity 82 tightly sealed from its environment. The seal is provided, at a point on its circumference, with a connection 83 which is shown only in simplified form, consists of a multi-part connecting piece and has a passage opening into the cavity 82. The seal 81 is elastomeric, consists, for example, of silicone rubber and can be deformed and extended by a fluid, for example compressed air, which is fed to its cavity 82 and is under pressure. When the seal 81 is in the relaxed, undeformed state and the seal has its intended ideal shape, its outer surface 81a is circular in cross-section and hence curved in a convex manner in cross-section around the entire seal. Moreover, the cross-section radius of the outer surface 81a of the seal 81 is at least approximately equal to the cross-sectional radius of curvature of the concave, arc-shaped groove surfaces of the grooves 66c and 68c. When the two wall parts 8, 9 are connected to one another, each groove 66c, 68c contains a cross-sectional segment of the seal 81. The connection 83 projects, for example radially with respect to the container axis 4, away from the seal 81, between the annular flanges 66, 68 to the outside. The flat support surfaces 66b, 68b are therefore interrupted at the connection 83 by a radial furrow, said furrows together receiving a section of the connection 83, which section is, for example, cylindrical. The flat support surfaces 66b and 68b enclose the grooves 66c and 68c, respectively, and the seal 81 essentially completely, i.e. apart from the interruption of the connection 83, in a projection parallel to the container axis 4.

A springy core 84 is preferably arranged in the cavity 82 of the seal 81. The cross-sectional area of said core is substantially smaller than the cross-sectional area of the cavity 82, so that the major part of the latter remains free, i.e. hollow. The core 84 is, for example, rectangular in cross-section, the longer side of the rectangle being approximately parallel to the container axis 4. The core 84 extends at least approximately along the entire circumference of the cavity 82 and forms, for example, a ring which is open at a circumferential point or a closed ring. The core 84 is formed from an elastically deformable material whose modulus of elasticity is substantially greater than that of the material forming the seal 81. The core 84 consists of a metallic material, such as, for example, steel, or possible of a resilient but not elastomeric plastic. The core 84 is springy and serves as a tensioning member for tensioning the seal 81, before insertion into the annular groove 66c, in such a way that the seal is as far as possible exactly circular and can be inserted into the groove 66c rapidly and without problems. However, the core 84 is deformable so that a separately delivered seal can be compressed during transport to form an elongated, flat ring occupying a small amount of space.

The annular flanges 69, 71, 72, 74 have, at their end faces facing one another in pairs, annular, flat support surfaces which are perpendicular to the container axis 4 and rest against one another in wall parts 9, 10, 11 connected to one another. Each annular flange 69, 71, 72, 74 has an annular, namely circular groove in its end face. These grooves are bounded in cross-section—i.e. in a section through the container axis 4—at least for the most part by a concave, namely circular groove surface. When the two wall parts 9, 10, 11 are connected to one another and abut one another with the annular flanges 69, 71, 72, 74, their grooves, together in pairs, bound channels which are open toward the fluidizing and process space 28b. Said channels contain annular, hollow seals 87 and 93 with a connection 89 and 94, respectively. The seals 87, 93 are formed similarly to the seal 81. An annular, hollow seal 95 with a connection 96 is arranged between generally cylindrical surfaces of the bottom wall part 6 and of the vertically displaceable wall part 7.

The perforated bottom 21 likewise shown in FIGS. 2, 3 and 4 has dimensionally stable, circular ring 101 and a gas-permeable sieve 102 enclosed by said ring and fastened to it and arranged below the upper ring edge 101a. When the perforated bottom 21 is in the operating position shown in FIGS. 1 to 4, the ring 101 and the sieve 102 are horizontal and the ring 101 is furthermore coaxial with the container axis 4. The ring 101 has a cylindrical outer surface. The inner surface of the ring 101 has an inner surface section 101b, which is inclined conically inward from the upper ring edge 101a downward toward the sieve, and a cylindrical section extending from the sieve to the lower edge of the ring. The cylindrical outer surface is connected at the upper ring edge 101a continuously to the conical inner surface section 101b by a narrow transition surface convex in cross-section. The sieve 102 consists, for example, of straight, narrow sectional rods 103 parallel to one another. Each sectional rod 103 has a flat, horizontal top surface located above in the operating position, tapers in cross-section downward away from said surface and has, in cross-section, approximately the shape of an acute-angled, equilateral triangle. A narrow gap is present between the sectional rods 103 adjacent to one another in pairs, along the entire length of said rods. The sectional rods 103 of the sieve 102 are supported underneath by a few support rods 104 intersecting the sectional rods 103 at right angles. The sectional rods 103 and support rods 103 are welded or possibly soldered at their ends firmly to the ring 101 and welded or possibly soldered or sintered to one another at their points of intersection. The bearing and pivot members 22 have two pivots 105 which are shown in FIG. 2, are fastened rigidly but detachably to the underneath of the ring 101 at two circumferential points of said ring diametrically opposite one another and are mounted in bearings 106 held by the all part 8. One of the two pivots 105 is manually and/or electrically or pneumatically or hydraulically pivotable by means of a pivot device arranged outside the container 3 and can be fixed in various pivotal positions.

The fluidized-bed apparatus 1 also has control means 121 for controlling various parts and operations. The control means 121 have, inter alia, fluid control means 122 for feeding a preferably gaseous fluid under pressure, namely compressed air, to the cavities of the seals 81, 87, 93, 95 and for removing it again from the state cavities. The fluid control means 122 have a compressed air inlet 123 which is connected to a compressed air source not shown—for example a connection of a compressed air network. The compressed air inlet 123 is connected to the connections 83, 89, 94, 96 of the hollow seals, for example via lines, at least one filter 124, multi-way valves 125, pressure sensors 126, chokes 127 and fast-action vent valves 128. The multi-way valves 125 and the fast-action vent valves 128 have an outlet opening into the environment. Furthermore, an indication and control device 131 having electronic and pneumatic components, small lamps, light emitting diodes, indicating instruments, possibly a monitor and manually operable switches and other operating members are present for monitoring the fluidized-bed apparatus 1 and for controlling it by means of a person and/or automatically.

The operation of the fluidized-bed apparatus 1 will now be described.

During "normal" operation, the wall parts 6 to 12 of the container 3 are firmly connected to one another. Furthermore, the perforated bottom 21 is in its horizontal operating position shown in FIGS. 1 to 4 and is fixed in this position by the bearing and pivot members 22. The upper ring edge 101a of the perforated bottom 21 is then in the height range between the inner edges of the two grooves 66c and 68c, approximately or exactly at the height of the support surfaces 66b, 68b support surfaces lie one on top of the other. An annular gap is present between the ring 101 and the inner surface of the wall 5—in particular the inner surface 66a of the annular flange 66. It is now also assumed that the cavity 82 of the seal 81 and, for example, also the cavities of the other hollow seals 87, 93, 95 had been vented beforehand and contain air whose pressure is equal to the air pressure in the environment of the container 3 and equal to the pressure in the container interior 28. The outer surface of the seal 81 is then circular in cross-section—as shown in FIGS. 2 and 3. That section of the seal 91 which is present between the inner edges of the grooves 66c, 68c then projects, for example, slightly inward—i.e. toward the container axis 4—beyond the cylindrical inner surfaces 66a and 68a, but could also be approximately or exactly flush with these. Furthermore, an annular gap is then present between the ring 101 of the perforated bottom 21 and the seal 81.

The compressed air source, which is not shown, can supply the compressed air inlet 123 with compressed air whose pressure has, for example, an absolute pressure value of approximately 600 kPa to 1000 kPa and is therefore approximately 500 to 900 kPa greater than the ambient air pressure. The multi-way valves 124 are provided with electrically controllable regulating members and can reduce and regulate the pressures of the compressed air fed to the cavities of the hollow seals, in cooperation with the pressure sensors 126 and electronic control circuits, to intended setpoint values. The multi-way valve 125 connected to the seal 81 can supply the cavity 82 of the seal 81 with compressed air whose pressure has alternatively a first pressure value or a second, lower pressure value. The first kPa to 700 kPa and may therefore by approximately 400 to 600 kPa above the ambient air pressure. The second pressure value may be, for example, approximately 200 kPa lower than the first pressure value, i.e. may be (absolutely) approximately 300 kPa to 500 kPa and accordingly may be approximately 200 to 400 kPa above the ambient air pressure. When compressed air is supplied to the other hollow seals 87, 93, 95, their pressure can always have the same absolute pressure value, for example in the range from 200 kPa to 700 kPa.

The pressures of the air present in the cavities of the seals 81, 87, 93, 95 can be kept at least approximately at the intended setpoint values by the fluid control means 122 for the required period. Furthermore, air can be discharged from the cavities of the hollow seals into the environment by means of the multi-way valves 125. The fast-action vent valves 128 are formed in such a way that, when the pressure at their connection connected via a choke to a multi-way valve 125 drops, they connect the cavity of the seal connected to them with the environment and effect rapid venting of the seals. During the discharge of air into the environment, the hollow seals can be vented completely, i.e. in such a way that the pressure in the cavities of the seals drops to the ambient air pressure. When the pressure of the air present in the cavity 82 of the seal 81 is equal to the first pressure value, however, it is possible to carry out only partial venting, during which the pressure in the cavity 82 falls from the first to the second pressure value.

The pressure in the container interior 28 is equal to the ambient air pressure or smaller than this in the various operations. When the cavities of the hollow seals 81, 87, 93, 95 are supplied with air at a pressure above the ambient air pressure, this air deforms the seals, the latter in particular also being extended in cross-section. Those outer surfaces of the seals which are circular in cross-section in the undeformed state of the seals 81, 87, 93 are then pressed against those groove surfaces of the grooves 66c, 68c or of the grooves of the annular flanges 69, 71, 72, 74 which form a concave arc. The seals 81, 87, 93 then lie tightly against the entire concave groove surfaces and connect the annular flanges adjacent to them tightly to one another. The seal 95 then connects the bottom wall part 6 tightly to the wall part 7. In the inflated state, the hollow, inflatable seals 81, 87, 93, 95 thus seal the interior of the container 3 from the environment of the container 3 in various connecting positions of wall parts.

When the pressure of the air present in the cavity 82 of the seal 81 reaches the first, greater pressure value, this seal 81 is pressed, in manner grooves 66c, 68c. In addition, the seal 81 is then curved inward, i.e. toward the container axis 4, in accordance with FIG. 4, between the inner edges of the grooves 66c, 68c, in such a way that it is no longer circular in cross-section and rests tightly against the ring 101 in the vicinity of the upper edge of said ring. When the cavity 82 of the seal 81 contains compressed air whose pressure is equal to the first pressure value, the seal 91 thus connects the two annular flanges 66, 68 of the wall parts 8 and 9, respectively, tightly to one another and at the same time connects the latter tightly to the ring 101 of the perforated bottom 21.

When the pressure of the air present in the cavity 82 so the seal 81 is only equal to the second, lower pressure value, the seal is curved toward the container axis only to a slight extent. The innermost point of the outer surface of the seal 81 which is located closest to the container axis 4 is then slightly inside the cylinder surface defined by the inner surfaces 66a, 68a. A free annular gap is then present between the perforated bottom 21 and the seal 81—similarly to the case of the completely vented seal in FIG. 3. However, the seal 81 still connects the annular flanges 66 and 68 lightly to one another.

Figure 4:
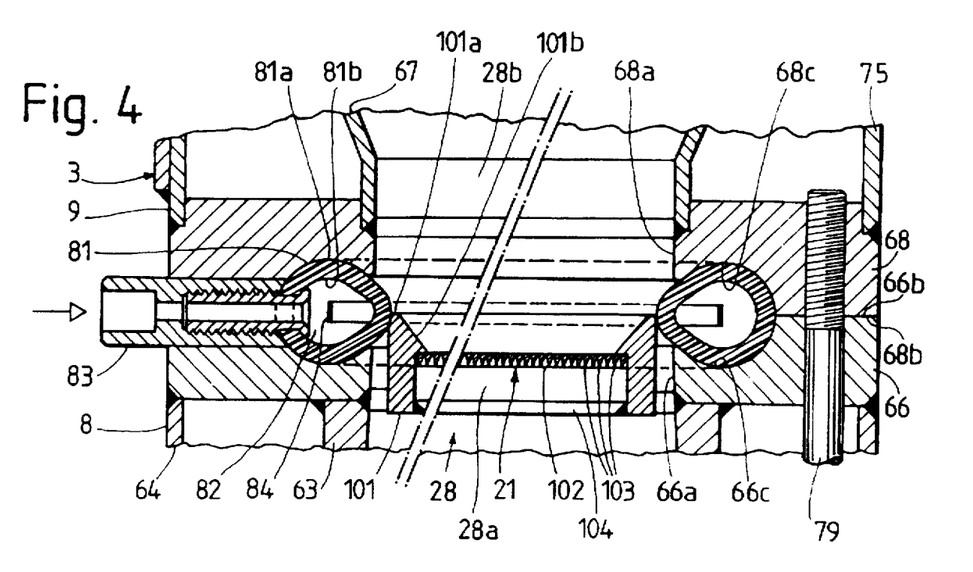
FIG. 4 shows sections of the container with the same seal as in FIG. 3, except that the seal is inflated and deformed.

When a particular material, for example material serving for the formation of ad rug, is to be agitated and treated in the container 3, the perforated bottom 21 is sealed with the seal 91 according to FIG. 4, i.e. tightly connected to the wall of the container. A batch of the particulate material is then introduced into the fluidizing and process space 28b through the temporarily opened material inlet 33. Furthermore, process gas consisting of air is sucked through the gas inlet 29 into the gas distribution space 28a, from this upward through the perforated bottom 21, through the fluidizing and process space 28b and through the filter 127 into the clean gas space 28c and then through the gas outlet 29 and out of the container 3. The process gas fluidizes the particulate material so that the latter forms a fluidized bed in the lower part of the fluidizing and process space 28b. During fluidization of the material, an at least partly liquid spray material may be sprayed onto the particles of the material at least temporarily by means of the spray member 27, in order to agglomerate said particles and/or to provide them with a coating. Furthermore, the particles are dried during fluidization. The spray member 43 and 47 of the wet cleaning devices 41 and 45, respectively, are present essentially completely in the housings 42 and 46 outside the container interior 28 during fluidization of a material. The spray members 53 and 57 of the wet and cleaning devices 51 and 55 are present essentially completely above the fluidizing and process space 28b. The latter and the gas distribution space 28a thus contain no spray members, serving for wet cleaning, curing treatment of a material and also during the emptying of the container 3.

When the treatment of the particulate material has ended, the passage of process gas through the container 3 is also terminated. Furthermore, the pressure of the compressed air present in the seal 81 is lowered from the first pressure value to the second pressure value so that a free annular gap then forms between the seal 81 and the perforated bottom 21. The perforated bottom is now swivelled with the pivot device of the bearing and pivot members 22 through approximately 90° into an approximately vertical employing position. The particulate material can now flow past the perforated bottom and through the temporarily opened material outlet 34 out of the container 3. For example, a new batch of particulate material is then treated in the container 3.

A part of the inner surface of the wall 5 and of the parts present in the container is cleaned, i.e. washed, with a cleaning liquid from time to time and in particular in the case of a change of the processed, particulate material and of the product produced therefrom. The various wall parts of the container remain tightly connected to one another during this procedure. For the wet cleaning, a cleaning liquid which is under a pressure of, for example, 400 kPa to 100 kPa (and has a temperature between 0° C. and 100° C. or possibly up to 150° C.) is fed alternately or simultaneously to the wet cleaning devices 41, 45, 51, 55. The cleaning liquid consists, for example, of water to which a detergent or other cleaning additive is also added for certain cleaning phases. The spray members 43, 47 present beforehand in their rest position are displaced by the cleaning liquid into the container interior 28, to the cleaning positions shown in FIG. 1. The cleaning liquid also displaces the spray members 53, 57 present beforehand in the rest positions downward into the cleaning positions shown in FIG. 1. The spray members of the wet cleaning devices 41, 45, 51, 55 then spray cleaning liquid against the outer surfaces of the filters 27, the lower surface of the inner wall part 25, the inner surfaces of the wall parts 8 to 11 and possibly also of the wall parts 6 and 7, those sections of the seals 81, 87, 93 which are adjacent to the interior 28, and the perforated bottom 21 and against any other parts also present below the inner wall part 25 in the container. The pressure of compressed air present in the cavity 82 in the seal 81 is equal to the second, lower pressure value during the wet cleaning or at least during a part thereof, so that the perforated bottom 21 is separated from the seal 81 by a gap. The perforated bottom 21 is swivelled into various positions during the wet cleaning and possibly turned through full rotations. The cleaning liquid is discharged from the container 3, for example, through the material outlet 34.

Figure 2:
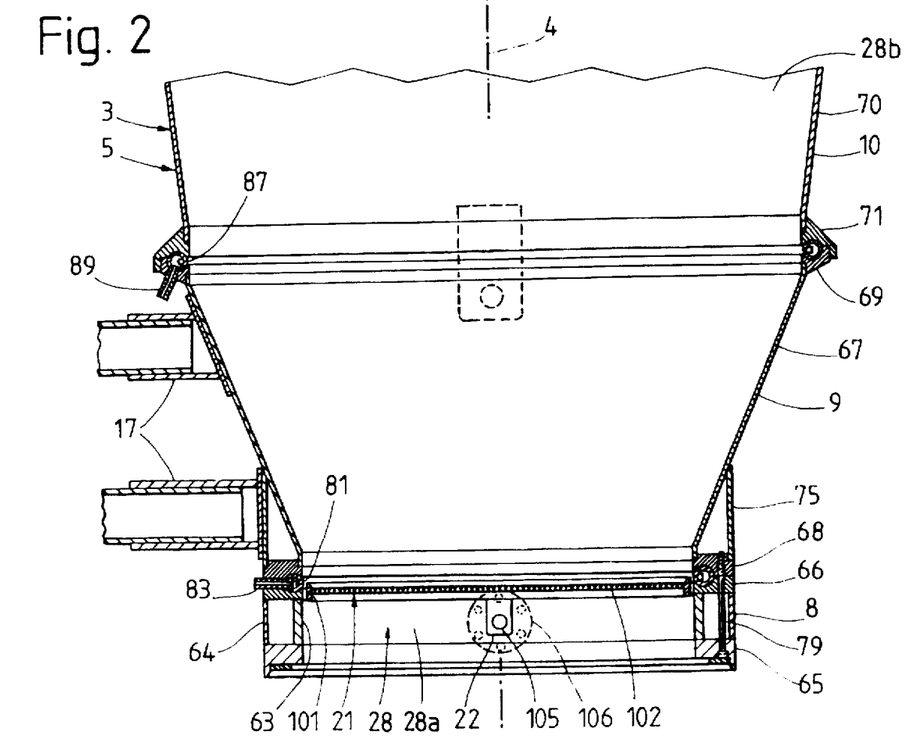
FIG. 2 shows a vertical section through a container region having two hollow seals, on a larger scale.
Figure 3:
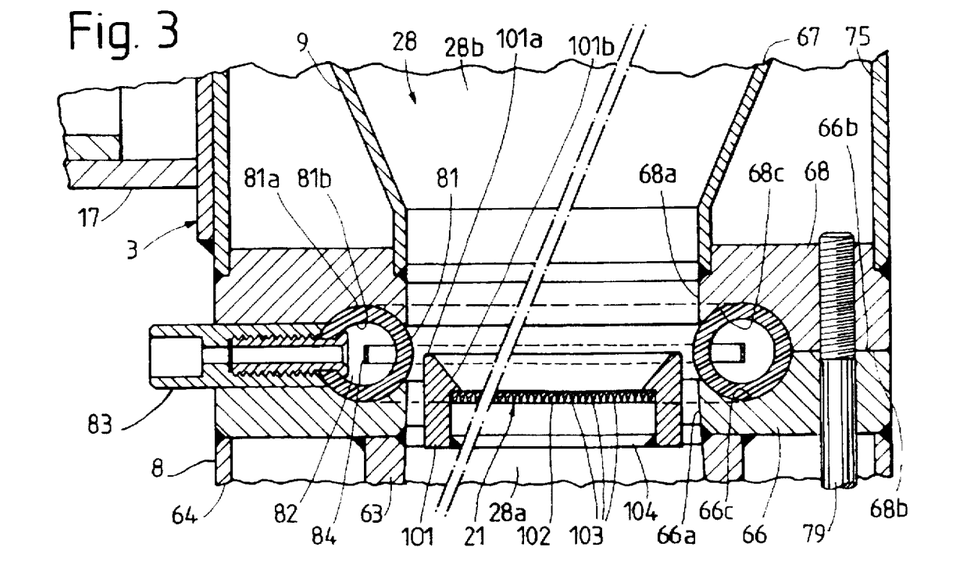
FIG. 3 shows sections of the container and of the lower seal shown in FIG. 2, on an even larger scale and with the seal in the undeformed state.

When the pressure of the compressed air present in the cavity 82 of the seal 81 is at the second, lower pressure value, the seal 81 forms a relatively smooth transition between the cylindrical inner surfaces 66a and 68a of the annular flange 66 or 68, respectively, similarly to FIGS. 2 and 3. When the seal 81 contains compressed air at the first, higher pressure value and connects the ring 101 of the perforated bottom 21 tightly to the wall of the container, according to FIG. 4, it forms, at the upper ring edge 101a, a relatively smooth transition between the inner surface 68a of the annular flange 68 and the conical inner surface section 101b of the ring 101, which surface section is inclined inward away from the upper ring edge 101a. When the seals 87, 93 contain compressed air, they likewise form fairly smooth transitions between the inner surfaces of the annular flanges tightly connected to one another by these seals. The fact that the seals 81, 87, 93 rest against the entire concave groove surfaces of the cross-sectional segments of these grooves containing seals, and the previously described, virtually smooth transitions formed by the seals, help to ensure that, during fluidization of a particulate material and during the discharge thereof from the container 3, little dust or other material remains attached to the connections sealed by the seals 81, 87, 93 and that those surfaces of the wall parts which are adjacent to the fluidizing and process space 28b and seals can be thoroughly cleaned during the wet cleaning. In the wet cleaning, it is particularly advantageous that no cleaning liquid enters the grooves 66c, 68c and the corresponding grooves of the annular flanges 69, 71, 72, 74. Furthermore, the cleaning liquid reaching the seals 81, 87, 93 and reaching those sections of the wall parts which are adjacent to said seals can readily flow away downward everywhere so that cleaning liquid does not accumulate anywhere. The formation of the perforated bottom 21 helps to ensure that virtually no material particles or dust particles remain behind in the sieve 102 during normal operation and that the perforated bottom can be thoroughly cleaned during the wet cleaning.

If the container interior 28 is to be made accessible, for example for inspection work, the hollow seals 81, 87, 93 and 95 are first temporarily vented. Some or all wall parts detachably connected to one another can then be separated from one another. Since the perforated bottom 21 is located close to the upper end of the wall part 8, it can then be easily installed in the wall part 8 or removed therefrom when the two wall parts 8, 9 are separated from one another. The hollow, inflatable seals ensure a good seal in spite of any impressions in manufacturing.

The apparatus can be modified in various ways. The transition surfaces curved at the inner edges of the grooves 66c, 68 and at the upper ring edge 101a can, for example, be replaced by edges. Furthermore, the cylindrical inner surface 68a and possibly also the cylindrical inner surface 66a and the cylindrical outer surface of the ring 101 could be replaced by inclined, conical surfaces. In the case of such a modification, it should be ensured that nowhere are there any dead spaces and channels or furrows in which impurities can collect during normal operation and cleaning liquid during the wet cleaning. Instead of the sieve 102 formed from sectional rods 103, the perforated bottom 21 can have a conventional sieve consisting of wires intersecting one another. Instead of compressed air, another gas at a pressure above the ambient air pressure or even a liquid can be fed to the cavity of the hollow seals.

For further details of the apparatus—in particular the formation of the wet cleaning devices 51, 55, the filters and the gas cleaning devices and of windows of the container— reference may be made to the U.S. patent applications Ser. Nos. 08/773,328, 08/773,329, and 08/773,327 simultaneously filed claiming the priorities of Swiss Patent Applications 3706/95, 3707/95 and 3708/95 and hereby incorporated by reference.

What is claimed is:

1. A fluidized-bed apparatus comprising a container for receiving and fluidizing particulate material, said container including a wall having two wall parts abutting one another and removable from one another, a perforated bottom within said container, and a sealing member for connecting said two wall parts tightly to one another and for connecting the perforated bottom tightly to the wall, wherein each of said two wall parts has an annular groove which is bounded in cross-section, at least in part, by a concave groove surface, wherein the two grooves together from a channel, open toward said perforated bottom, in the abutting wall parts, wherein said sealing member comprises an annular seal which has a cavity for receiving a fluid, a smooth outer surface which is, at least in part, convex in cross-section and continuous in cross-section around the entire seal, cross-sectional segments of said seal located in said grooves in said two wall parts abutting one another, and wherein said perforated bottom and said seal are disposed with respect to each other such that the seal is deformable by said fluid, fed to its cavity and under pressure, such that said seal rests tightly against each of said two wall parts and against the perforated bottom.

2. An apparatus as claimed in claim 1, wherein said container defines a container axis, wherein said perforated bottom is pivotable about an axis of rotation perpendicular to the container axis, wherein said perforated bottom and said seal are disposed with respect to each other such that the seal rests tightly against each of said two wall parts and against the perforated bottom when the pressure is at a first pressure value and rests tightly against each of said two wall parts but is separated from the perforated bottom by a gap when the pressure is at a second pressure value which is lower than said first pressure value.

3. An apparatus as claimed in claim 2, further comprising fluid control means for passing said fluid under pressure into said cavity of said seal and out of said cavity and for keeping the pressure of said fluid within the cavity of said seal approximately at said first pressure value or approximately at said second pressure value.

4. An apparatus as claimed in claim 1, wherein each said annular groove has an outer groove edge on its side facing away from the perforated bottom and wherein, in the state abutting one another, the two wall parts have abutting support surfaces directly adjacent to each said outer groove edge.

5. An apparatus as claimed in claim 1, wherein each annular groove has a groove bottom and two groove edges and widens in cross-section over its entire depth from the groove bottom to the groove edges.

6. An apparatus as claimed in claim 1, wherein the outer surface of the seal is curved in a convex manner in cross-section around the entire seal when said seal is at a predetermined pressure state.

7. An apparatus as claimed in claim 1, wherein the outer surface of said seal is circular in cross-section when said seal is at a predetermined pressure state, and wherein the concave groove surface of each of said annular grooves forms a part of an arc in cross-section.

8. An apparatus as claimed in claim 1, wherein said seal is adjacent to the entire concave groove surface of each groove and said seal essentially fills each said groove when said seal connects said two parts tightly together.

9. An apparatus as claimed in claim 1, wherein a springy core is arranged in the cavity of the seal and extends at least approximately along the entire circumference of the cavity, only partly fills the latter in cross-section and consists of a material whose modulus of elasticity in greater than that of the material forming the seal.

10. An apparatus as claimed in claim 1, wherein the perforated bottom has a ring with an upper ring edge and a sieve enclosed by the ring and located below the upper ring edge, wherein the ring has an inner surface section inclined inward from the upper ring edge of the sieve and wherein the seal is formed to rest against the ring in the vicinity of the upper ring edge.

11. An apparatus as claimed in claim 1, wherein the container contains an interior sealed from the environment, wherein the wall parts and the seal bound the interior and wherein at least one spray member is present for spraying a cleaning liquid in the interior against the wall parts, the perforated bottom and the seal.

12. An apparatus as claimed in claim 11, wherein said at least one spray member includes a housing arranged on the outside of said container, said housing includes an interior sealed from the environment of the container and wherein said at least one spray member is adjustable from a rest position, in which said spray member is within said housing, to a cleaning position in which said spray member is at least partly outside said housing and within said interior of the container.

* * * * *